United States Patent
Brown et al.

[11] Patent Number: 5,829,784
[45] Date of Patent: Nov. 3, 1998

[54] AIRBAG INFLATOR FOR VEHICLE OCCUPANT RESTRAINT APPARATUS

[75] Inventors: Steven Joseph Brown, Pittsfield, Mass.; Larry Stefan Ingram, Lawrenceville, N.J.; Neale Arthur Messina, Philadelphia, Pa.; Fedor Olszanskyj, Richmond, Mass.; William Hugo Reitz, Jr., Lawrenceville, N.J.

[73] Assignee: General Dynamics Armament Systems, Inc., Falls Church, Va.

[21] Appl. No.: 800,189

[22] Filed: Feb. 13, 1997

[51] Int. Cl.$^6$ ................................................ B60R 21/26
[52] U.S. Cl. .............................................. 280/737; 280/741
[58] Field of Search ...................................... 280/737, 741

[56] References Cited

U.S. PATENT DOCUMENTS

| | | | |
|---|---|---|---|
| 3,889,703 | 6/1975 | Keathley | 280/737 |
| 4,341,147 | 7/1982 | Mayer | 89/7 |
| 4,523,507 | 6/1985 | Magoon | 89/7 |
| 4,523,508 | 6/1985 | Mayer et al. | 89/7 |
| 4,693,165 | 9/1987 | Magoon et al. | 89/7 |
| 4,745,841 | 5/1988 | Magoon et al. | 89/7 |
| 4,907,486 | 3/1990 | Mayer | 89/7 |
| 5,060,973 | 10/1991 | Giovanetti | 280/736 |
| 5,487,561 | 1/1996 | Mandzy et al. | 280/741 |
| 5,536,039 | 7/1996 | Cuevas | 280/737 |
| 5,601,308 | 2/1997 | Cuevas | 280/737 |
| 5,639,117 | 6/1997 | Mandzy et al. | 280/737 |
| 5,669,631 | 9/1997 | Johnson et al. | 280/737 |
| 5,713,596 | 2/1998 | Messina et al. | 280/737 |

*Primary Examiner*—Kenneth R. Rice
*Attorney, Agent, or Firm*—Finnegan, Henderson, Farabow, Garrett & Dunner, L.L.P.

[57] ABSTRACT

To achieve a reduced inflation rate of an airbag in a vehicle occupant restraint apparatus, an airbag inflator is provided with a seal ring acting, in response to initial pressurization by a pyrotechnic initiator, to open injection ports, such that liquid propellant may be regeneratively pumped by a piston from a reservoir into a combustion chamber for combustion. The resulting combustion gases flow through a series of swirl chambers to increase residence time and through a plenum chamber where the combustion gases are cooled. The combustion gases exit the plenum chamber as an airbag inflation gas.

39 Claims, 5 Drawing Sheets

AIRBAG INFLATOR FOR VEHICLE OCCUPANT RESTRAINT APPARATUS

FIELD OF THE INVENTION

The present invention relates to safety apparatus, and particularly to passive restraint apparatus utilizing an inflatable airbag for preventing serious injury to occupants of a motor vehicle involved in an accident.

BACKGROUND OF THE INVENTION

"Passive" restraint apparatus, which requires no action by a vehicle occupant to render operative, as contrasted to "active" restraint apparatus requiring a conscious effort by an occupant to render operative (such as conventional seat belts), are now commonly included as standard equipment in motor vehicles due to government agency, insurance industry, and consumer pressures. Experience and testing have shown that the most effective passive occupant restraint approach is to abruptly (in a matter of milliseconds) inflate an airbag automatically in response to a high impact accident. The inflated airbag cushions a vehicle occupant from the effects of the accident for an interval sufficient to prevent serious injury.

The mechanics for timely inflating an airbag are basically of two types. One type involves storing a liquefied gas under high pressure in a reservoir. On impact, the liquefied gas is released, which then converts to a gas that inflates the airbag.

The second basic type of airbag inflation apparatus uses ignitable propellants that are combusted to rapidly generating a large volume of bag inflation gas by exothermic reaction. Heretofore, the propellants invariably have been in a solid or granular form and comprised of low energy compositions, such as an alkali metal azide, cupric oxide, boron nitrate, etc. The solid propellants need not be stored under pressure, are stable over time under varying ambient conditions, and are convenient to package in a passive restraint apparatus.

As an alternative to the use of propellants in solid or granular form as the inflation gas generator, liquid propellants for this purpose are being investigated. Viable approaches to using a liquid propellant in an airbag inflator are disclosed in U.S. Pat. No. 5,060,973, issued to Giovanetti, U.S. Pat. No. 5,487,561, issued to Mandzy et al., and Mandzy et al., U.S. patent application Ser. No. 08/658, 436, filed Jun. 5, 1996. The numerous advantages afforded by the use of liquid propellants in an airbag inflation apparatus are noted in these documents, the disclosures of which are incorporated herein by reference.

To protect passengers, as well as drivers of vehicles, airbags are now being installed in dashboards for protection against frontal collisions and in doors for protection against side impact collisions. Bag size and inflation parameters are dependent on the particular installation site, and each installation varies according to vehicle type and make. Thus, bag inflators must be designed not only to satisfy the unique inflation parameters appropriate for each particular installation site, but also must be sized to fit into the available space that is unique to each installation site. Regarding inflation parameters, recent studies have indicated that particularly abrupt bag inflation, rather than protecting vehicle occupants in the event of a high impact accident, may instead inflict injury, even death, to occupants; this is particularly so in the case of children.

SUMMARY OF THE INVENTION

It is an objective of the present invention to provide an improved inflator utilizing controlled combustion of a liquid propellant to achieve a reduced rate of airbag deployment, so as to soften the impact of the inflating airbag on occupant of a vehicle involved in an accident.

To achieve this objective in accordance with one aspect of the present invention, there is provided an airbag inflator comprising a casing having inflation ports, a combustion chamber in the casing for receiving a propellant, and at least one swirl chamber in the casing. The inflator also comprises an initiator in the casing for igniting the propellant in the combustion chamber to produce combustion gases that flow through swirl ports into the swirl chamber and through the swirl chamber in a swirling, circular manner to increase residence time while enroute to the inflation ports where the combustion gases exit the casing as an inflation gas to deploy an airbag.

This objective of the invention is also achieved in accordance with another aspect of the present invention by providing an airbag inflator comprising a casing having a vent for fluid communication with an airbag, a cylinder provided in the casing, and a piston slidably received in the cylinder. The piston includes a piston head defining, to a rearward side, a reservoir containing a liquid propellant, and, to a forward side, a combustion chamber in fluid communication with the housing vent. Injection ports, which extend through the piston head between the reservoir and the combustion chamber, are normally blocked by a seal ring slidably received in the cylinder and having a surface area exposed to the reservoir. The inflator further comprises an inflation initiator that operates, in response to a vehicle collision, to pressurize the reservoir and to drive the seal ring forwardly to unblock the injection ports, such that liquid propellant may flow into the combustion chamber for ignition and generation of combustion gases that flow through the vent to inflate the airbag.

The objective of the present invention is also achieved by a further aspect of the invention, wherein an airbag inflator is provided as comprising a casing, a cylinder provided in the casing, a piston sliding received in the cylinder and including a piston head defining, to a rearward side, a reservoir containing a liquid propellant, and, to a forward side, a combustion chamber, and normally blocked injection ports extending through the piston head between the reservoir and the combustion chamber. The airbag inflator further comprises a first swirl chamber provided in the casing and including entry swirl ports communicating with the combustion chamber and exit swirl ports communicating with a second swirl chamber surrounding the first swirl chamber and in fluid communication with the exit swirl ports and inflation ports provided in the casing for fluid communication with an airbag. The inflator further includes an inflation initiation, operable, in response to a vehicle collision, to pressurize the reservoir and unblock the injection ports, such that liquid propellant may flow into the combustion chamber for ignition and generation of combustion gases that flow through the entry swirl ports into the first swirl chamber, through the exit swirl ports into the secondary swirl chamber, and through the inflation ports enroute to the airbag.

In accordance with an additional aspect of the invention, there is provided an airbag inflator comprising a casing having inflation ports, a cylinder provided in the casing, a piston slidably received in the cylinder, the piston including a piston head defining, to a rearward side, a reservoir containing a liquid propellant, and to a forward side, a combustion chamber, normally blocked injection ports extending through the piston head between the reservoir and the combustion chamber, and a piston rod joined with the piston head and extending rearwardly through a casing endwall. The piston rod includes a cavity and a normally blocked passage leading from the cavity into the combustion chamber. The inflator further comprises an inflation initiator provided in the piston rod cavity and operable, in response to a vehicle collision, to pressurize the combustion chamber through the passage, the pressurized combustion chamber producing a fluid pressure in the reservoir effective to unblock the ejection ports and then to pump liquid propellant through the ejection ports into the combustion chamber for ignition and generation of combustion gases that flow through the inflation ports to inflate an airbag.

The present invention may also be embodied in the form of a passive occupant restraint apparatus comprising a housing configured for installation in a motor vehicle. The housing includes first and second compartments with an airbag stored in the first housing compartment In folded configuration and an inflator disposed in the second housing compartment in fluid flow communication with the airbag in the first housing compartment. The inflator includes a casing, a cylinder provided in the casing, and a piston slidably received in the cylinder, the piston including a piston head defining, to the rearward side, a reservoir containing a liquid propellant, and, to a forward side, a combustion chamber, and a piston rod joined with the piston head and extending rearwardly through an endwall of the casing. The piston rod is cylindrical in shape to provide a cavity, a passage extends through the piston head between the piston rod cavity and the combustion chamber, and injection ports extend through the piston head between the reservoir and the combustion chamber. The inflator further includes an initiator including a solid propellant stored in the piston rod cavity and an electrically detonatable squib sealed in an opening into the cavity through an open end of the piston rod beyond the endwall and wired to a collision sensor. Upon detonation of the squib by the collision sensor in response to a vehicle accident, the solid propellant is ignited to produce combustion gases flowing through the passage to pressurize the combustion chamber, pressurization of the combustion chamber produces a fluid pressure in the reservoir effective to pump liquid propellant from the reservoir into the combustion chamber for ignition and generation of combustion gases that flow through inflation ports in the casing to inflate the airbag.

Additional features, advantages and objectives of the present invention will be set forth in the description that follows and in part will be apparent from the description, or may be learned by practice of the invention. The objectives and advantages of the present invention will be realized and obtained by the apparatus particularly pointed out in the following written description and the appended claims, as well as in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and together with the description, serve to explain the principles of the invention.

BRIEF DESCRIPTION OF THE DRAWINGS

Like reference numerals refer to corresponding parts throughout the several views of the drawings.

DETAILED DESCRIPTION OF THE PREFERRED EMBODIMENT

Figure 1:
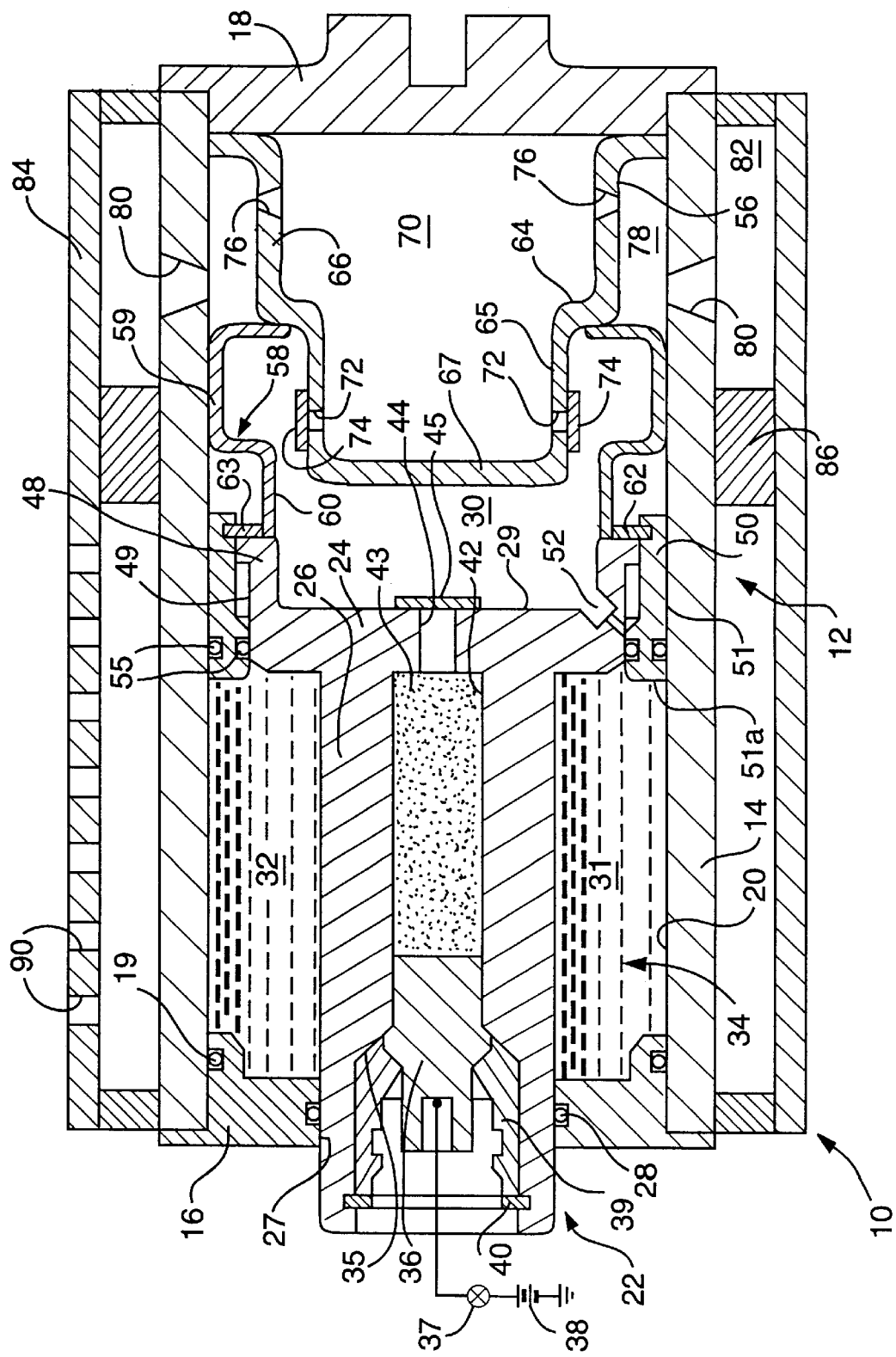
FIG. 1 is a sectional view of an airbag inflator structured in accordance with a preferred embodiment of the present invention.

In accordance with the present invention, and as embodied herein, an airbag inflator, generally indicated at 10 in FIG. 1, includes a casing, generally indicated at 12, that is defined by a cylindrical wall 14 closed off at its left end by a rear endwall 16 and at its right end by a forward endwall 18. The endwalls are fixed in place by suitable means, such as a welded joint, to prevent fluid leakage. To this end, the endwalls may be fitted with O-ring seals, such as indicated at 19 in the case of rear endwall 16.

The interior surface of casing wall 14 provides a cylinder 20 for receiving a piston, generally indicated at 22. This piston includes a piston head 24 and a cylindrical piston rod 26 extending rearwardly through a central bore 27 in endwall 16, which is preferably fluid-sealed by an O-ring 28. The forward face 29 of piston head 24 defines, in part, a combustion chamber 30, while the rearward piston head face 31, together with piston rod 26 and endwall 16, defines an annular reservoir 32 containing a liquid propellant (LP) 34. As disclosed in the cited Giovanetti and Mandzy et al. patents, the liquid propellant may be a hydroxyl ammonium nitrate-based liquid monopropellant. A particularly suitable liquid propellant composition comprises, by mass, approximately 60% hydroxyl ammonium nitrate (HAN) as an oxidizer, 20% triethyl ammonium nitrate (TEAN) as a fuel, and 20% water as a diluent.

The rearward end of piston rod 26 is counterbored to provide a tapered annular shoulder 35 for seating an initiator or squib 36 which, in installation, is wired to a crash sensor 37, such as an inertial switch connected to a vehicle battery 38. Squib 36 is pressed in fluid-sealed engagement with shoulder 35 by a spring type retaining washer 40 via an annular plug 39.

A cavity 42 provided by cylindrical piston rod 26 forwardly of squib 36 contains a solid propellant booster charge 43, such as boron potassium nitrate, which is ignited by electrically initiated detonation of squib 36 upon closure of the inertial switch (crash sensor 37). The byproducts of booster charge combustion exit cavity 42 through a passage 44 in piston head 24 to flow into combustion chamber 30. This passage is normally blocked by a frangible seal 45 designed to rupture during ignition of the booster charge. Seal 45 may take a variety of forms, such as, for example, an adhesive-backed, aluminum foil patch.

Still referring to FIG. 1, piston head 24 is integrally provided with a forwardly extending skirt 48 serving to provide a cylindrical bearing surface 49 accommodating sliding motion of a seal ring 50. This seal ring, in turn, provides a peripheral, cylindrical bearing surface 51 that slides against the surface of cylinder 20 (inner surface of casing wall) to support and guide a rearward stroke of piston 22. In the position shown in FIG. 1, seal ring 50 presents an inwardly projecting, annular valve shoulder 51*a* in blocking relation with a plurality of equiangularly spaced and angularly inwardly directed LP injection ports 52 drilled through piston head 24 at the junction of its forward face 29 with skirt 48. As illustrated, valve shoulder 51*a* may be equipped with O-rings 55 to fluid-seal its sliding interfaces with piston head skirt 48 and cylinder 20.

A generally cup-shaped partition 56 is inserted into the right end of casing 12 in press-fit relation, with its open end closed by endwall 18 and its closed end portion defining a forward boundary for combustion chamber 30. A convoluted retainer sleeve, generally indicated at 58, includes a large diameter cylindrical portion 59, press-fitted against the cylinder surface, and a reduced diameter cylindrical portion 60, whose rearward termination normally butts against the forward termination of piston head skirt 48. A snap ring 62, lodged in an annular groove 63 formed in seal ring 50, butts against the forward termination of piston head skirt 48 to define a rearward position for the seal ring during assembly and in service. As also seen in FIG. 1, retainer sleeve portion 59 is provided with an inwardly turned radial wall 64, which butts against a shoulder between stepped diameter cylindrical wall sections 65 and 66 of partition 56. Retainer sleeve portions 59 and 60 thus provide a radial boundary for combustion chamber 30, and retainer sleeve wall 64, together with the partition wall section 65 and partition radial wall section 67, provides a forward boundary for combustion chamber 30.

Figure 2A:
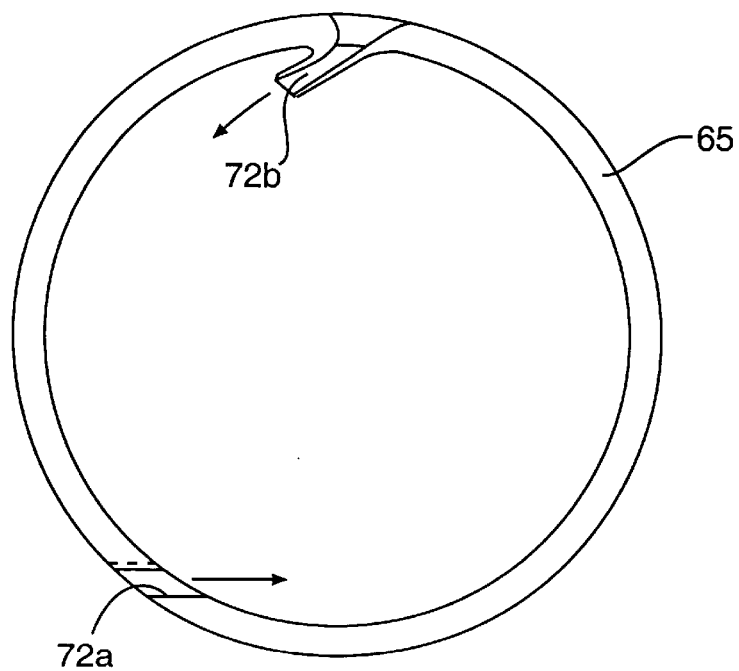
FIGS. 2 and 2b are sectional views illustrating alternative swirl port designs that may be utilized in the airbag inflator of FIG. 1 during an airbag inflation operation.
Figure 2B:
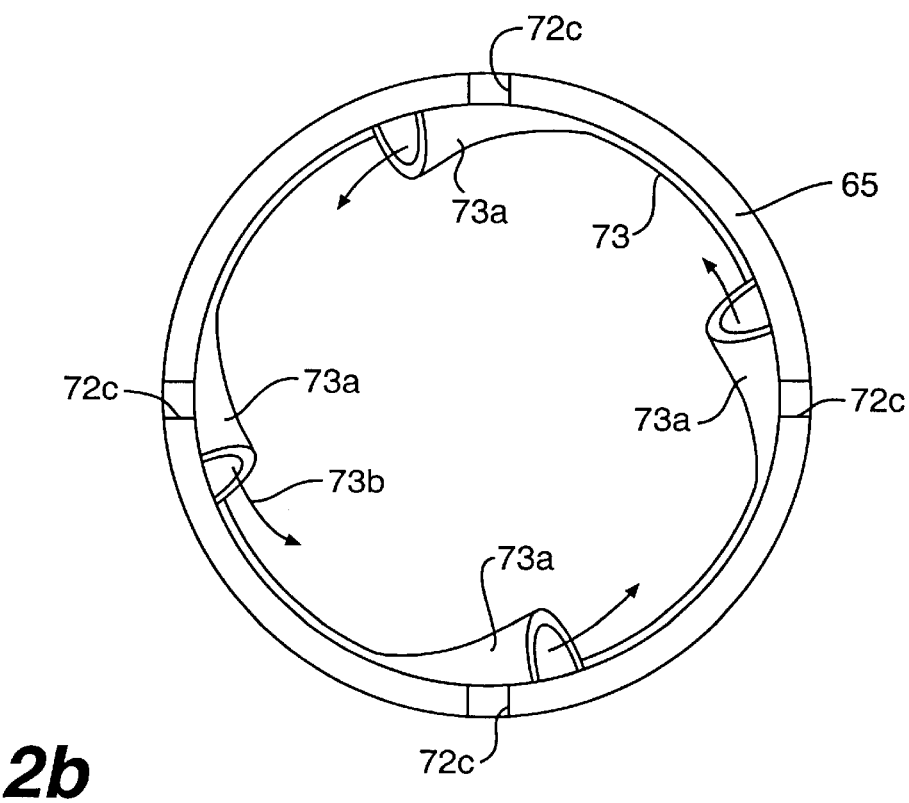

The interior of cup-shaped partition 56 provides a swirl chamber 70 in fluid communication with combustion chamber 30 through a plurality of equiangularly spaced swirl ports 72 in partition wall section 65. The term "swirl" is intended to characterize ports 72 as being configured to achieve a circular or swirling flow of fluid (gases) in chamber 70 upon entry from combustion chamber 30. For this purpose, ports 72 may be drilled through partition wall section 65 at an oblique angle, as indicated at 72*a* in FIG. 2*a*, such that gases enter chamber 70 closely tangential to the inner cylindrical surface of the partition wall section. Alternatively, as indicated at 72*b* in FIG. 2*a*, the ports may be punched through the partition wall at oblique angles, leaving a tangentially directed drawn metal mouth. As a further alternative, the ports may be drilled radially through partition wall section 65, as indicated at 72*c* in FIG. 2*b*. A swirl ring 73 may be inserted in chamber 70 with inwardly stamped, louvered openings 73*a*, located at the exit ends of the ports to impose introductory tangential fluid flow of the gases, as indicated by arrows 73*b*. The benefit achieved by utilization of swirl ports 72 will be discussed below. Note that these swirl ports are normally closed by frangible sealing patches 74, which may also be adhesive-backed aluminum foil.

From swirl chamber 70, gas flow is through equiangularly spaced swirl ports 76 in partition wall section 66 into an annular chamber 78. Swirl ports 76 are also normally closed by frangible seal patches 74. Swirl ports 80 in casing wall 14 permit gas flow from annular chamber 78 into an annular plenum chamber 82 provided between an outer cylindrical shell 84 and casing 14. Preferably, a ring 86 of porous media of suitable heat exchanging material, such as braided steel mesh screens, is positioned in plenum chamber 82, which the gases flow through and are cooled enroute to a plurality of vent holes 90 in shell 84 leading to an airbag, seen in FIG. 3.

Figure 3:
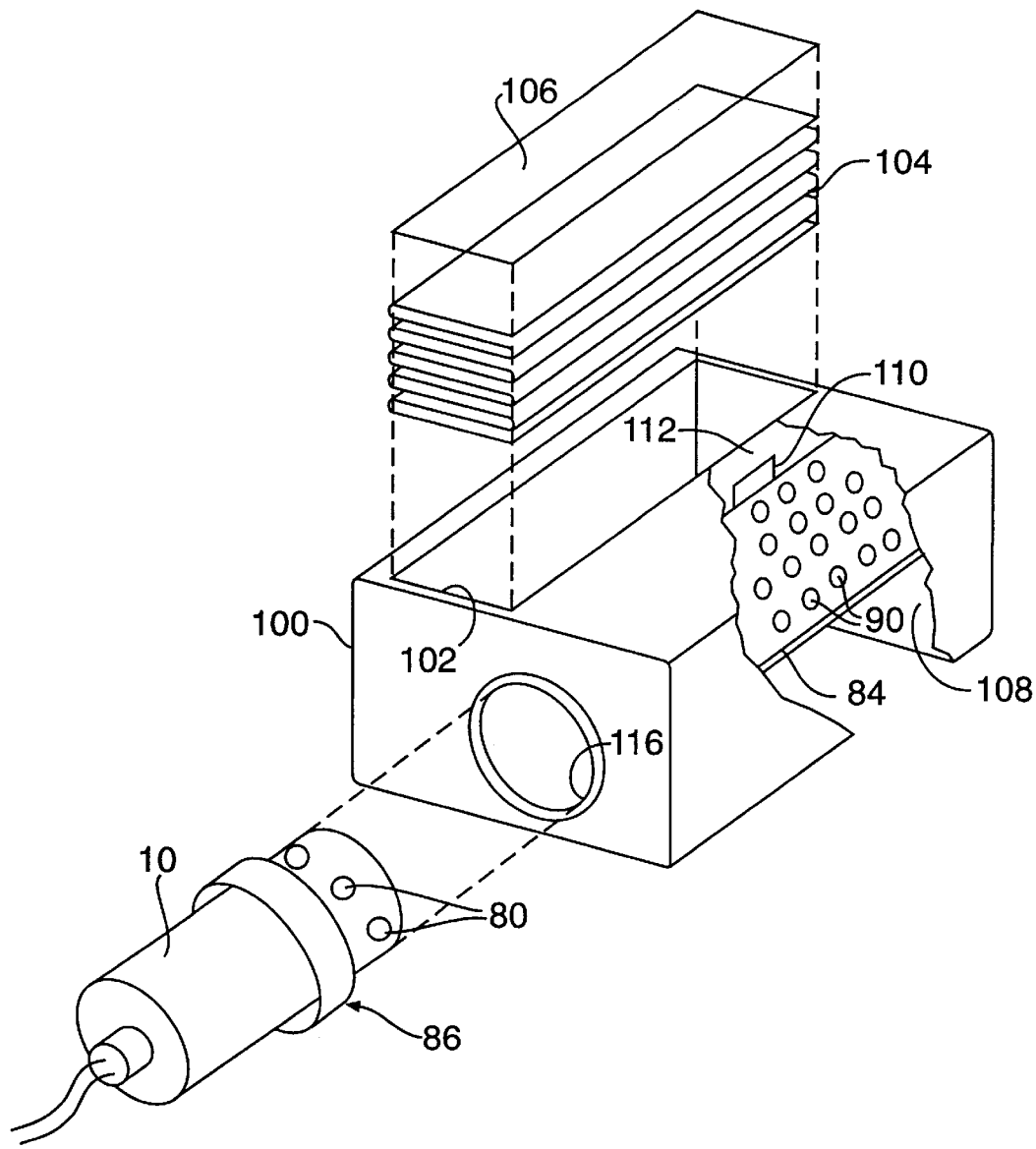
FIG. 3 is a perspective view of a vehicle occupant restraint apparatus incorporating the airbag inflator of FIG. 1.

FIG. 3 illustrates an exemplary vehicular installation of inflator 10 of FIG. 1. A housing 100, for installation in vehicle dashboard (or door), includes a compartment 102 for storing a folded airbag 104 for inflation. The compartment is closed by a dashboard cover 106. The outer shell 84, seen in FIG. 1, may instead be pre-installed in an inflator compartment 108 of housing 100. Large vent openings, one illustrated at 110, in a partition 112 separating the airbag and inflator compartments, permit the flow of inflation gases from the shell vents 90 into the open mouth of the airbag 104 for deployment. Inflator 10 is simply inserted through a housing opening 114 into operating position within shell 84 to complete assembly of a passive occupant restraint apparatus.

Figure 4A:
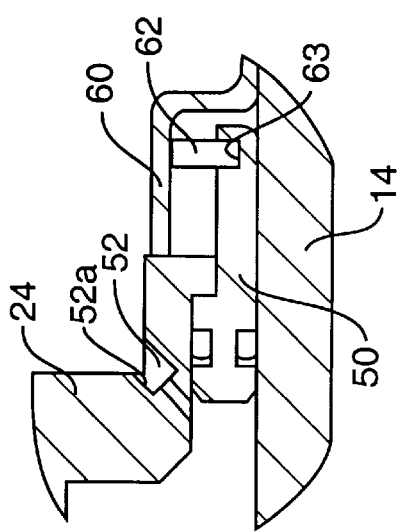
FIG. 4a is a fragmentary section view of a portion of the airbag inflator of FIG. 1, illustrating the action of a seal ring to open injection ports and begin airbag inflation.

To initiate operation of inflator 10 in the deployment of airbag 109, inertial switch 37 (FIG. 1) closes in response to a vehicle collision, thereby firing squib 36. Booster charge 43 is detonated to abruptly pressurize cavity 42 in piston rod 26. Frangible seal 45 ruptures, allowing the booster charge combustion gases to flow through piston head passage 44 into combustion chamber 30. Since the surface area of the forward piston head face 29 is greater than the rear surface 31 of the piston head, due to the presence of piston rod 26, the LP fluid pressure in reservoir 32 must exceed the combustion chamber fluid pressure to achieve a balance of opposing forces acting on the piston head. Consequently, a fluid pressure amplification effect is achieved in the LP reservoir. Seal ring 50 is thus driven forwardly by this amplified LP fluid pressure, to unblock the injection ports 52, as seen in FIG. 4*a*. LP is then pumped into the combustion chamber for ignition by the booster charge combustion gases. The LP fluid pressure tracks the fluid pressure in the combustion chamber, but always exceeds the combustion chamber fluid pressure by a multiplication factor equal to the differential surface area of the piston head faces. This being the case, a regenerative fluid pressure differential is continuously available to pump LP 34 from reservoir 32 through the injection ports 52 into combustion chamber 30. With continued pumping of the LP from its reservoir into the combustion chamber for spontaneous combustion, piston 22 is driven rearwardly to take up the contracting volume of the LP in the reservoir. The self-sustaining combustion of the LP pumped into the combustion chamber generates combustion gases for inflating the airbag. Note in FIG. 4*a* that injection ports 52 are counterbored, as indicated at 52*a*, to reduce the pressure drop of the LP injected into the combustion chamber.

Figure 4B:
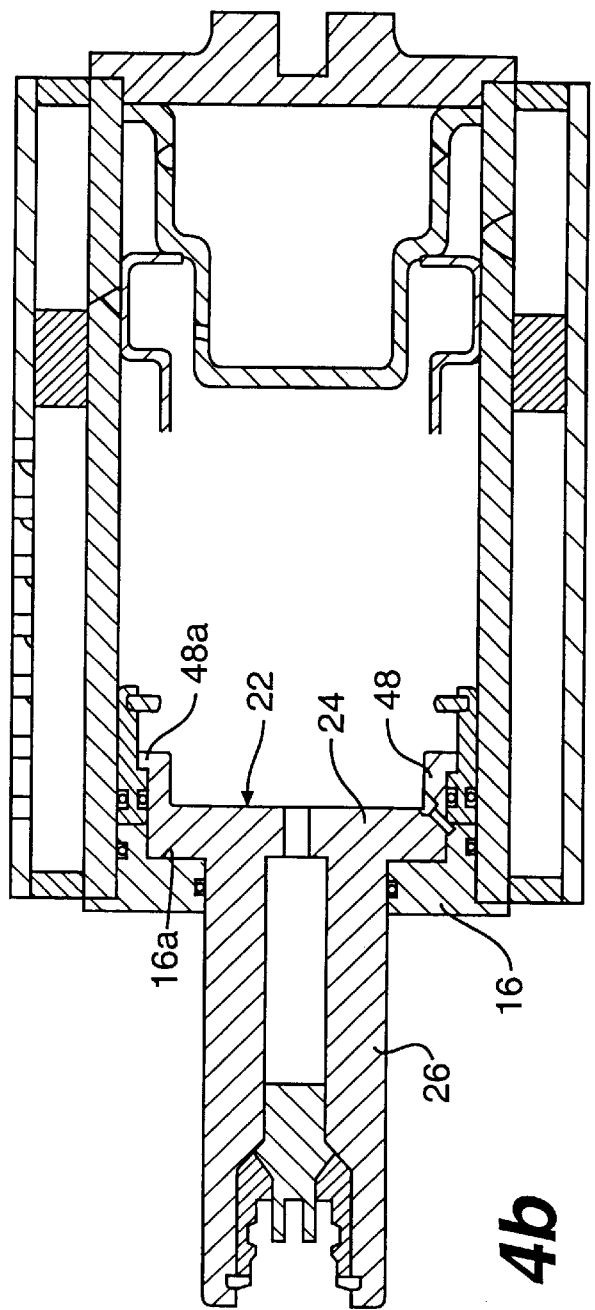
FIG. 4b is a sectional view of the airbag inflator of FIG. 1, illustrating positions of various parts at the conclusion of airbag deployment.

FIG. 4*b* illustrates piston 22 at the conclusion of its rearward stroke. By virtue of recess 16*a* in endwall 16, piston head 24 can bottom out against the inner surface of the endwall to reduce the LP reservoir volume to virtually zero, and thus ensure that all of the LP is injected into the combustion chamber. Note that a radially projecting lip 48*a* at the termination of piston head skirt 48 engages valve shoulder 51 of seal ring 50, such that the seal ring is drawn rearwardly along with piston 22 to the end of its rearward stroke illustrated in FIG. 4*b* without blocking injection ports 52. Thus, the seal ring serves as an annular bearing sliding along the inner surface of cylinder 20 to provide support and guidance for piston 22 during its rearward stroke.

Shortly after LP combustion begins in combustion chamber 30, the frangible seals 74 blocking swirl ports 72 are ruptured, allowing the LP combustion gases to flow into swirl chamber 70. The swirling (circular) flow of the combustion gases in swirl chamber 70 increases the residence time of the combustion gases in the swirl chamber. This is an important feature, since, not only does it retard airbag inflation, any unburned, atomized LP entrained in the combustion gases flowing into the swirl chamber is afford a further opportunity to be ignited by the high temperature combustion gases.

The relationship of the size and number of exit swirl ports 76 to the size and number of entry swirl ports 72 may be conveniently set to appropriately shift fluid pressure choke points imposed by the swirl ports, so as to achieve progressive LP burn performance and less abrupt airbag deployment.

From secondary swirl chamber 78, the combustion gases flow through swirl ports 80 into plenum chamber 78. The gases are then cooled during flow through the porous media ring 86 enroute to vent openings 90 leading to deployment of the airbag.

Figure 5:
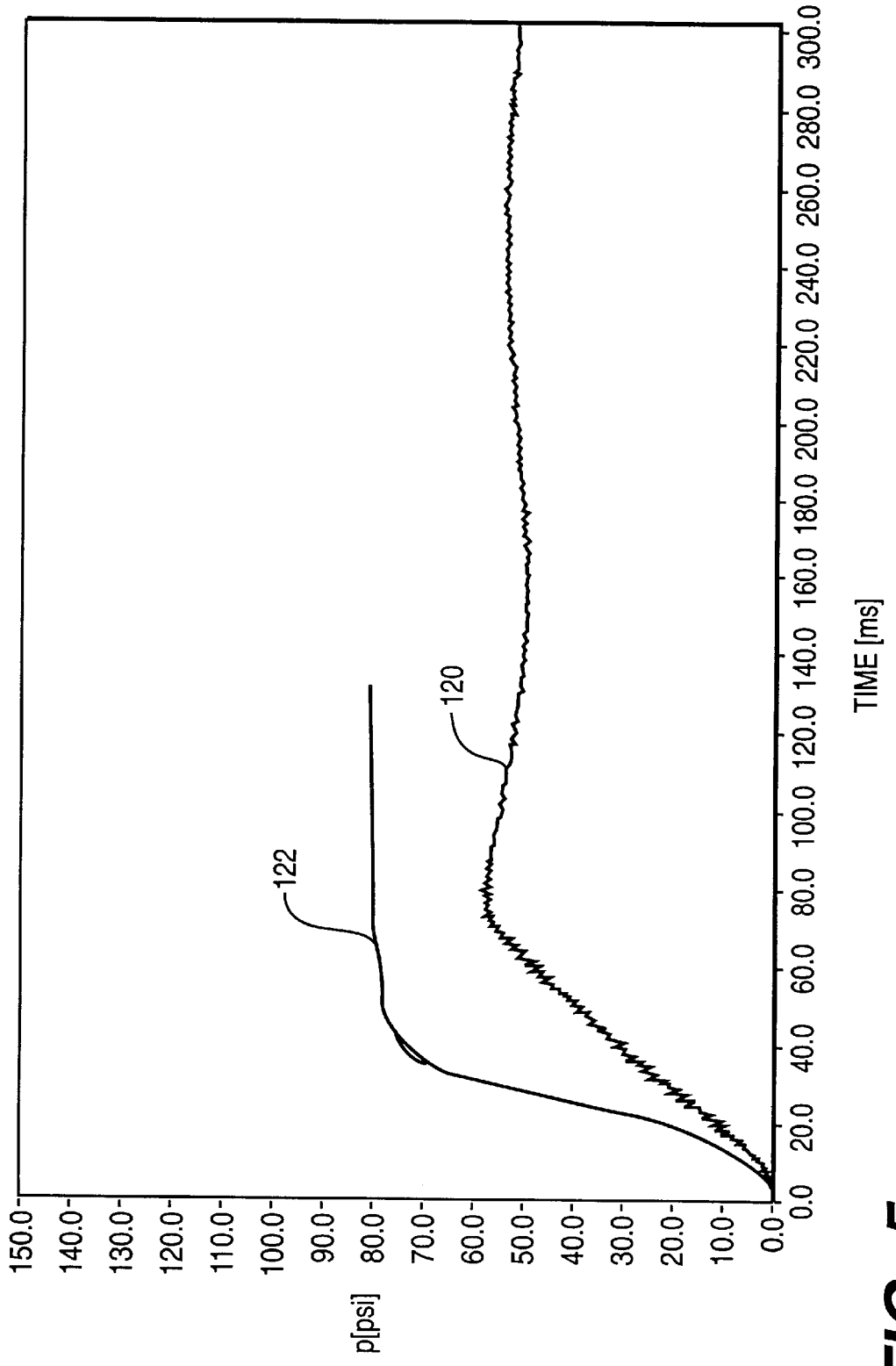
FIG. 5 is a graph comparing an airbag pressure curve typical of current inflators and an airbag pressure curve produced by the inflator of FIG. 1.

FIG. 5 illustrates a representative airbag pressure curve 120 generated during inflation operation of inflator 10 of the present invention. As seen, the airbag is fully inflated to maximum pressure of 57 psi in approximately 75 ms. The linear slope of this pressure curve leading to full deployment indicates that impact of the airbag with a vehicle occupant is considerably less forceful as compared to a representative pressure curve 122 generated by state of the art solid propellant airbag inflators.

It will be apparent to those skilled in the art that various modifications and variations may be made to the vehicle occupant restraint apparatus of the present invention without departing from the spirit of the invention. Thus, it is intended that the scope of the present invention cover modifications and variations thereof, provided they come within the spirit of the appended claims and thus equivalents.

In the claims:

1. An airbag inflator comprising:
   a casing having a vent for fluid communication with an airbag;
   a cylinder provided in the casing;
   a piston slidably received in the cylinder, the piston including:
      a piston head defining, to a rearward side, a reservoir containing a liquid propellant, and, to a forward side, a combustion chamber in fluid communication with the housing vent, and
      injection ports extending through the piston head between the reservoir and the combustion chamber;
   a seal ring slidably received in the cylinder and having a surface area exposed to the reservoir, the seal ring normally blocking the injection ports; and
   an inflation initiator operable, in response to a vehicle collision, to pressurize the reservoir and to drive the seal ring forwardly to unblock the injection ports, such that liquid propellant may flow into the combustion chamber for ignition and generation of combustion gases that flow through the vent to inflate the airbag.

2. The airbag inflator defined in claim 1, wherein a surface area of the piston head exposed to the combustion chamber exceeds a surface area of the piston head exposed to the reservoir, such that pressurization of the combustion chamber by the initiator produces an amplified fluid pressure in the reservoir effective to achieve continued pumping of the liquid propellant through the injection ports into the combustion chamber as the piston moves rearwardly with diminishing volume of the reservoir.

3. The airbag inflator defined in claim 2, wherein the piston further includes a rearwardly extending piston rod having a cavity containing the initiator, and the piston head further includes a passage extending between the cavity chamber and the combustion chamber.

4. The airbag inflator defined in claim 3, further including a frangible seal blocking the passage, the seal rupturing upon operation of the initiator to pressurize the combustion chamber.

5. The airbag inflator defined in claim 4, wherein the piston rod is slidably received through a rearward endwall of the casing, and the initiator includes a solid propellant stored in the piston rod cavity and an electrically detonatable squib sealed in an opening into the cavity through an end of the piston rod beyond the endwall.

6. The airbag inflator defined in claim 2, wherein the seal ring is slidably received between a peripheral surface of the piston head and an inner surface of the cylinder.

7. The airbag inflator defined in claim 6, wherein the peripheral surface of the piston head is provided by a forwardly extending, annular skirt.

8. The airbag inflator defined in claim 7, wherein the piston head skirt and the annular seal include radial projections in normally axially spaced relation to permit forward sliding movement of the annular seal relative to the piston head to unblock the injection ports, the radial projections interengaging such that the seal ring is drawn rearwardly by the piston without blocking the injection ports, the seal ring providing a sliding bearing between the piston head and the cylinder inner surface.

9. The airbag inflator defined in claim 8, wherein the seal ring includes seal elements for preventing fluid leakage between interfaces with the piston head peripheral surface and the cylinder inner surface.

10. The airbag inflator defined in claim 9, wherein the casing includes a rearward endwall having a recess for receiving the piston head to conclude a rearward stroke of the piston and to reduce the reservoir volume to essentially zero.

11. The airbag inflator defined in claim 6, further including a partition located in the casing in forwardly spaced relation with the piston head to separate the combustion chamber from a secondary chamber through which the combustion gases flows enroute to the casing vent.

12. The airbag inflator defined in claim 11, wherein the partition includes entry swirl ports structured to produce circular flow of the combustion gases in the secondary chamber upon entry from the combustion chamber.

13. The airbag inflator defined in claim 12, further including frangible seals blocking the entry swirl ports until fluid pressure in the combustion chamber rises to an elevated magnitude.

14. The airbag inflator defined in claim 13, further comprising an outer shell defining with an exterior surface of the casing a plenum chamber, the casing vent provided as a plurality of swirl ports in a wall of the casing, and a plurality of vents in the outer shell leading to the airbag.

15. The airbag inflator defined in claim 14, further including a porous media disposed in the plenum chamber to cool the combustion gases flowing therethrough from the casing wall swirl ports to the outer shell vents.

16. The airbag inflator defined in claim 15, wherein the partition is cup-shaped to provide an interior space closed by a forward endwall of the casing, the secondary chamber defined by the closed interior space of the cup-shaped partition.

17. The airbag inflator defined in claim 16, wherein the cup-shaped partition defines with the inner cylinder surface an annular tertiary chamber, and exit swirl ports in the cup-shaped partition accommodating combustion gas flow from the secondary chamber into the tertiary chamber en route to the plenum chamber.

18. The airbag inflator defined in claim 17, further including a retaining ring fitted in the casing, the retaining ring having a forward end portion defining a rearward boundary for the tertiary chamber and a rearward end portion defining a forward position of the piston.

19. An airbag inflator comprising:
   a casing;
   a cylinder provided in the casing;
   a piston slidably received in the cylinder, the piston including:
      a piston head defining, to a rearward side, a reservoir containing a liquid propellant, and, to a forward side, a combustion chamber, and
      normally blocked injection ports extending through the piston head between the reservoir and the combustion chamber;
   a first swirl chamber provided in the casing, the first swirl chamber including entry swirl ports in fluid communication with the combustion chamber and exit swirl ports;
   a second swirl chamber surrounding the first swirl chamber and in fluid communication with the exit swirl ports;
   inflation ports provided in a wall of the casing for fluid communication with an airbag; and
   an inflation initiator, operable, in response to a vehicle collision, to pressurize the reservoir and unblock the injection ports, such that liquid propellant may flow into the combustion chamber for ignition and generation of combustion gases that flow through the entry swirl ports into the first swirl chamber, through the exit swirl ports into the secondary swirl chamber, and through the inflation ports enroute to the airbag.

20. The airbag inflator defined in claim 19, further comprising frangible seals blocking the entry swirl ports, the frangible seals rupturing when subjected to elevated fluid pressures in the combustion chamber.

21. The airbag inflator defined in claim 20, wherein a surface area of the piston head exposed to the combustion chamber exceeds a surface area of the piston head exposed to the reservoir, such that pressurization of the combustion chamber by the initiator produces an amplified fluid pressure in the reservoir effective to achieve continued pumping of the liquid propellant through the injection ports into the combustion chamber as the piston moves rearwardly with diminishing volume of the reservoir.

22. The airbag inflator defined in claim 21, further comprising an outer shell defining with an exterior surface of the casing an annular plenum chamber, the casing inflation ports provided as a plurality of inflation swirl ports in the casing wall, and a plurality of vents in the outer shell leading to the airbag.

23. The airbag inflator defined in claim 22, further including a porous media ring disposed in the plenum chamber to cool the combustion gases flowing therethrough from the casing wall swirl ports to the outer shell vents.

24. The airbag inflator defined in claim 23, wherein the first swirl chamber is provided by a cup-shaped partition fitted in the casing, the second swirl chamber provided between the cup-shaped partition and the casing wall.

25. The airbag inflator defined in claim 24, further comprising a retaining ring fitted in the casing, the retaining ring having a radial forward end portion contacting the cup-shaped partition to define a boundary between the combustion chamber and the second swirl chamber.

26. An airbag inflator comprising:
   a casing having inflation ports;
   a cylinder provided in the casing;
   a piston slidably received in the cylinder, the piston including;
      a piston head defining, to a rearward side, a reservoir containing a liquid propellant, and to a forward side, a combustion chamber;
      normally blocked injection ports extending through the piston head between the reservoir and the combustion chamber, and
      a piston rod joined with the piston head and extending rearwardly through a casing endwall, the piston rod including a cavity and a normally blocked passage leading from the cavity into the combustion chamber; and
   an inflation inflator provided in the piston rod cavity and operable, in response to a vehicle collision, to pressurize the combustion chamber through the passage, the pressurized combustion chamber producing a fluid pressure in the reservoir effective to unblock the ejection ports and then to pump liquid propellant through the ejection ports into the combustion chamber for ignition and generation of combustion gases that flow through the inflation ports to inflate an airbag.

27. The airbag inflator defined in claim 26, wherein a surface area of the piston head exposed to the combustion chamber exceeds a surface area of the piston head exposed to the reservoir, such that pressurization of the combustion chamber by the initiator produces an amplified fluid pressure in the reservoir effective to achieve continued pumping of the liquid propellant through the injection ports into the combustion chamber as the piston moves rearwardly with diminishing volume of the reservoir.

28. The airbag inflator defined in claim 27, wherein the initiator includes a solid propellant stored in the piston rod cavity and an electrically detonatable squib sealed in an opening into the cavity through an end of the piston rod beyond the endwall.

29. The airbag inflator defined in claim 28, wherein the piston rod is of an elongated cylindrical shape to provide the cavity.

30. An passive occupant restraint apparatus comprising, in combination:
   a housing configured for installation in a motor vehicle, the housing including first and second compartments;
   an airbag stored in the first housing compartment In folded configuration; and
   an inflator disposed in the second housing compartment in fluid flow communication with the airbag in the first housing compartment, the inflator including:
      a casing,
      a cylinder provided in the casing,
      a piston slidably received in the cylinder, the piston including a piston head defining, to the rearward side, a reservoir containing a liquid propellant, and, to a forward side, a combustion chamber, and a piston rod joined with the piston head and extending rearwardly through an endwall of the casing, the piston rod being cylindrical in shape to provide a cavity, and a passage extending through the piston head between the piston rod cavity and the combustion chamber, injection ports extending through the piston head between the reservoir and the combustion chamber, a collision sensor, and an initiator including a solid propellant stored in the piston rod cavity and an electrically detonatable squib sealed in an opening into the cavity through an open end of the piston rod beyond the endwall, the squib wired to the collision sensor, whereby detonation of the squib by the collision sensor in response to a vehicle accident ignites the solid propellant to produce combustion gases flowing through the passage to pressurize the combustion chamber, pressurization of the combustion chamber produces a fluid pressure in the reservoir effective to pump liquid propellant from the reservoir into the combustion chamber for ignition and generation of combustion gases that flow through inflation ports in the casing to inflate the airbag.

31. The apparatus defined in claim 30, wherein the inflator further includes a frangible seal blocking the passage, the seal rupturing in response to ignition of the solid propellant stored in the piston rod cavity.

32. The apparatus defined in claim 31, wherein the inflator further includes a seal ring slidably received between a peripheral surface of the piston head and an inner surface of the cylinder, the seal normally positioned to block the injection ports, the seal ring being driving forwardly by the amplified fluid pressure in the reservoir to unblock the injection ports.

33. The apparatus defined in claim 32, wherein the inflator further includes a first swirl chamber in the casing and including a plurality of angularly distributed entry swirl ports in communication with the combustion chamber and exit swirl ports, and a second swirl chamber surrounding the first swirl chamber and in fluid communication with the first swirl chamber through the exit swirl ports.

34. The apparatus defined in claim 33, wherein the inflator further includes an outer shell defining with an exterior surface of the casing an annular plenum chamber in fluid communication with the second swirl chamber through the casing inflation ports provided as a plurality of inflation swirl ports, and a plurality of vents in the outer shell leading to the airbag.

35. The apparatus defined in claim 34, wherein the inflator further includes a porous media ring disposed in the plenum chamber to cool the combustion gases flowing from the inflation swirl ports to the outer shell vents.

36. An airbag inflator comprising:

a casing having inflation ports;

a combustion chamber in the casing for receiving a propellant;

at least one swirl chamber in the casing and including swirl ports; and an initiator in the casing for igniting the propellant in the combustion chamber to produce combustion gases that flow through the swirl ports into the swirl chamber and through the swirl chamber in a swirling, circular manner to increase residence time while enroute to the inflation ports where the combustion gases exit the casing as an inflation gas to deploy an airbag.

37. The airbag inflator defined in claim 36, wherein the at least one swirl chamber is a first swirl chamber having a plurality of entry swirl ports and a plurality of exit swirl ports spaced from the entry swirl ports, the airbag inflator further including a second swirl chamber surrounding the first swirl chamber, whereby the combustion gases flow from the combustion chamber through the entry swirl ports into the first swirl chamber, from the first swirl chamber through the exit swirl ports into the second swirl chamber and through the second swirl chamber to the inflation ports.

38. The airbag inflator defined in claim 37, wherein the inflation ports are inflation swirl ports, the airbag inflator further comprising an outer shell surrounding the casing in radially spaced relation to define an annular plenum chamber, the inflation gas exiting the inflation swirl ports flows through the plenum chamber to exit vents leading to the airbag.

39. The airbag inflator defined in claim 38, further comprising a porous media ring located in the plenum chamber between the inflation swirl ports and the exit vents to cool the inflation gas flowing therethrough.

* * * * *